(12) United States Patent
Hart et al.

(10) Patent No.: US 6,504,397 B1
(45) Date of Patent: Jan. 7, 2003

(54) OUTPUT CONTROLLED LINE DRIVER WITH PROGRAMMABLE COMMON MODE CONTROL

(75) Inventors: Siegfried Hart, Santa Cruz, CA (US); Palaksha Setty, Sunnyvale, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/949,260

(22) Filed: Sep. 7, 2001

(51) Int. Cl.$^7$ ............................................... H03K 17/16
(52) U.S. Cl. ............................... 326/30; 326/27; 326/83; 327/109
(58) Field of Search ............................... 326/30, 82, 83, 326/86, 26, 27; 327/108, 109, 561, 562, 563

(56) References Cited

U.S. PATENT DOCUMENTS 5,581,197 A * 12/1996 Motley et al. ................. 326/30
6,054,874 A *  4/2000 Sculley et al. ................. 326/83

OTHER PUBLICATIONS

IEEE Journal of Solid–State Circuits, vol. 35, No. 11, Nov. 2000 Entitled: Low–Power Area–Efficient High–Speed I/O Circuit Techniques—pp. 1591–1595 By: Ming–Ju Edward Lee, william J. Dally, Member, IEEE, and Patrick Chiang.

* cited by examiner

Primary Examiner—Daniel D. Chang
(74) Attorney, Agent, or Firm—Brinks Hofer Gilson & Lione

(57) ABSTRACT

A differential line driver having integrated output termination resistors is disclosed. The termination resistors are a combination of a controlled transistor and a low precision resistor. The transistor calibrates-out the imprecision of the resistor based on a precise electrical reference. In a preferred embodiment the transistor is a CMOS transistor and the resistor is a CMOS resistor. The combination of a CMOS transistor and CMOS resistor features higher linearity and precision than a CMOS transistor alone due to the smaller effective drain-source voltage across the CMOS transistor. Moreover, the present invention discloses independent programmability of the integrated output termination resistor, the output common mode voltage, and the output amplitude. The value of the output termination resistor(s), the value of the output common mode voltage, and the value of the output amplitude are controlled independently and are continuously maintained with respect to a precise electrical reference. As a result, the value of the output termination resistance, the value of the output common mode voltage, and the value of the output amplitude are insensitive to manufacturing process tolerances and variations in temperature and supply voltage.

18 Claims, 3 Drawing Sheets

OUTPUT CONTROLLED LINE DRIVER WITH PROGRAMMABLE COMMON MODE CONTROL

FIELD OF THE INVENTION

The present invention relates to CMOS signaling and transmit drivers and specifically to devices and methods for terminating such drivers.

BACKGROUND ART

Typically, transmit drivers used in CMOS signaling applications utilize discreet off-chip resistors for output termination. Off-chip components add additional system costs and are generally outside the control of the chip fabricator which may result in system performance degradation. Generally, off-chip termination results in unterminated circuit portions composed of package parasitics and internal circuitry. These unterminated circuit portions can cause large reflections on the signal line.

Prior art devices and methods having integrated open drain output drivers, and internal fixed or external fixed termination resistors are limited, providing only fixed output voltage swing and fixed common mode voltage levels. Moreover, the output current of the integrated open drain driver flows through a bond wire and package inductance to create a voltage signal across the external termination resistors. The voltage drop across these inductances causes problems at higher switching speeds. Prior art systems and methods do not provide sufficient electrical control of the output driver's source impedance.

Therefore, it would be advantageous to build termination resistors on the chip rather than using discreet off-chip resistors. However, CMOS application processes do not provide a material from which accurate and temperature insensitive resistors may be produced. Moreover, DC-coupled systems require a controlled common mode voltage level at the output of the line driver. For applications where the line length and therefore the line attenuation is not known, it furthermore would be desirable to be able to change the output amplitude of the transmitted signal after the chip is embedded in the application.

Therefore, there is a need for a new and improved line driver device and method for providing precise on-chip termination resistors to improve system performance, versatility, and reduce costs. Such a new and improved line driver device should be able to accurately set the value of the internal output termination resistors, the value of the output common mode voltage, and the value of the output signal amplitude independently of each other. Furthermore, the line driver device should maintain these three parameters independently from manufacturing process tolerances, temperature and supply voltage variations. The present invention provides solutions for these and other problems not addressed by the prior art.

BRIEF SUMMARY

The present invention provides a device and method for providing onchip termination resistors for high speed CMOS signaling and transmit line drivers. Furthermore, the present invention provides a fully integrated differential line driver with an independent control over the internal output termination resistor, the value of the output common mode voltage level, and the value of the output signal amplitude. Advantageously, the internal output termination resistor, the output common mode voltage level, and the value of the output signal amplitude are automatically calibrated based on a precise electrical reference.

Thus, the present invention has many advantages and benefits over the prior art. For example, the present invention may offer a cost savings by eliminating the need for external termination components. Additionally, the present invention may provide superior electrical source impedance termination of the transmit line driver. That is, the system and method of the present invention terminate the output of the line driver, creating a system which is insensitive to manufacturing process tolerances, temperature and supply variations. Moreover, since the present system and method terminate the driver inside the chip, at the output of the line driver, signal reflections on the signal line are kept to a minimum. Beneficially, post manufacturing calibration of the output voltage swing, output common mode voltage level, and output termination resistor value may be performed independently.

Thus, the present invention may be utilized in, but is not limited to, integrated line drivers, integrated output buffers, high speed digital signaling and serial links.

Further objects, features and advantages of the invention will become apparent from consideration of the following description and the appended claims when taken in connection with the accompanying drawings.

DETAILED DESCRIPTION OF EMBODIMENTS OF THE INVENTION

Figure 1:
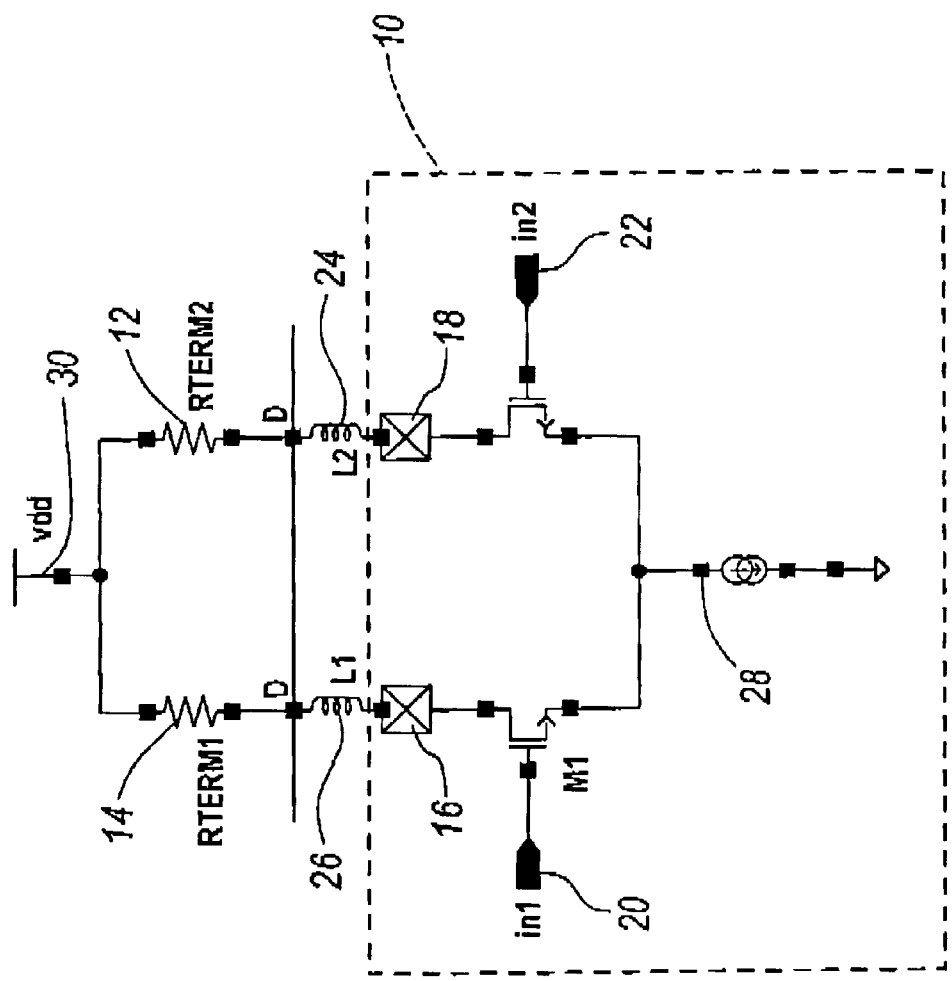
FIG. 1 is a schematic diagram illustrating a prior art system for external termination of a differential open drain output driver.

FIG. 1 illustrates a prior art system and method for terminating an integrated circuit (IC) 10. Typically, IC 10 is terminated using external termination resistors, such as resistors 12 and 14. IC 10 includes at least two bonding pads 16 and 18 for connecting, for example, input transistors 20 and 22 to external termination resistors 12, 14. In practice, bonding pads 16 and 18 are wire bonded to the external termination resistors 12 and 14 using wire bonds 24 and 26.

Input transistors 20 and 22 are connected to a negative supply voltage via the current source 28, and the external termination resistors 12 and 14 are connected to a positive power supply voltage 30. In this manner, chip termination may be achieved.

Typically, IC 10 is a differential open drain output driver having external termination resistors 12, 14. Such line drivers have limited versatility in that they provide only a fixed output voltage swing and fixed common mode levels. Moreover, the output current of the integrated open drain driver flows through bond wires 24, 26 and package inductance to create a voltage signal across the external termination resistors 12, 14. The voltage drop caused by these inductances causes problems at higher switching speeds. Additionally, the line driver configuration shown in FIG. 1 does not provide sufficient electrical control of the source impedance.

Figure 2:
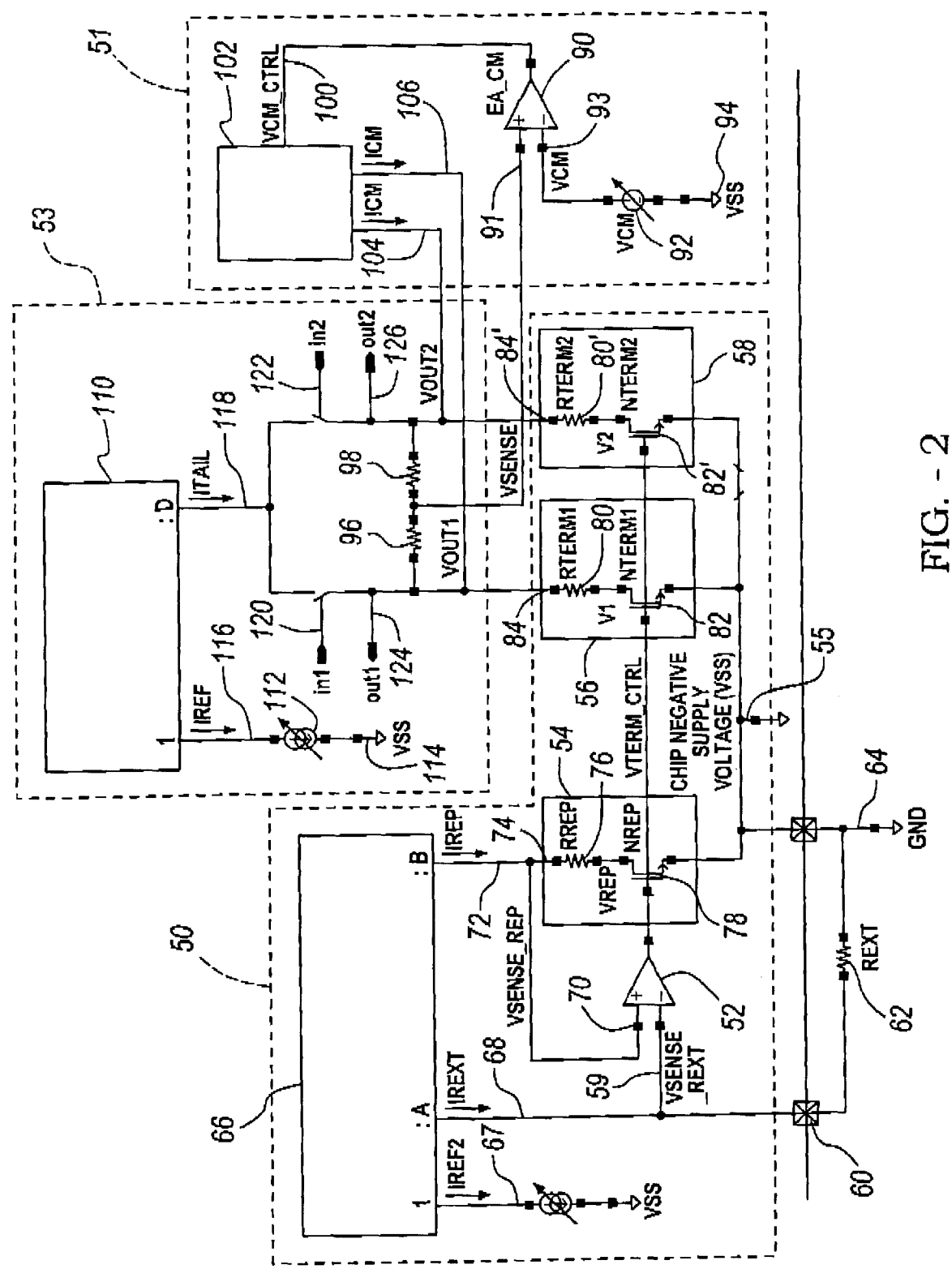
FIG. 2 is a schematic diagram of an embodiment of a line driver utilizing on-chip termination resistors, in accordance with one embodiment the present invention.

Referring now to FIG. 2, an embodiment of the present invention that provides adjustable on-chip termination, adjustable common mode voltage control, and adjustable output voltage swing control is illustrated. The present invention may be incorporated into integrated circuits that normally require external output termination resistors. For example, the present invention may be incorporated into a line driver.

In an embodiment of the present invention, two independent control loops are provided. The first control loop, an output termination loop 50, controls the output termination resistance (OTR), and the second loop, a common mode voltage control loop 51 controls the output common mode voltage.

Output termination loop 50 includes an impedance termination error amplifier 52 or similar device, a termination resistor replica 54, preferably two output termination resistors 56 and 58, and a current mirror 66 or similar device that provides currents "$i_{REXT}$" and "$i_{REP}$" on lines 68 and 72, respectively.

A negative terminal 59 of error amplifier 52 is in communication with a bond pad 60. Bond pad 60 is connected to an external reference resistor 62. Further, negative terminal 59 is also in communication with current mirror 66 via line 68 for receiving current $i_{REXT}$. A positive terminal 70 of error amplifier 52 is connected to line 72 of the current mirror 66 for receiving current $i_{REP}$ and to the high voltage side of termination resistor replica 54.

Termination resistor replica 54 includes a replica resistor 76 having a resistance "RREP" and a replica transistor 78 connected in series with replica resistor 76. Output termination resistors 56 and 58 generally include output resistors 80 and 80', having resistances "RTERM1" and "RTERM2," and output transistors 82 and 82', also connected in series with termination resistors 56 and 58. However, present invention contemplates termination resistor replica 54 including only a transistor, such as replica transistor 78 or similar device. Further, it is contemplated that output termination resistors 56 and 58 including only transistors, such as output transistors 82 and 82' or similar devices. Replica transistor 78 and output transistors 82 and 82' are preferably CMOS transistors, and resistors 76, 80, and 80' are preferably CMOS resistors. Other process technologies such as PMOS may be used for replica transistor 78 and output transistors 82 and 82'.

With continuing reference to FIG. 2, the operation of output termination loop 50 will now be reviewed. For explanation purposes only the following assumptions will be made:

1) termination resistor replica 54 is a copy of the output termination resistors 56 and 58, such that the resistors, as well as the transistors, are of about the same size: RTERM1=RTERM2=RREP, and NTERM1=NTERM2=NREP;
2) the multiplication factor A (the ratio of current IREXT to current IREF2) and multiplication factor B (the ratio of current IREP to current IREF2) are both equal or about equal to 1.0; and
3) the multiplication factor D (the ratio of current ITAIL to current IREF) is set to about 1.0.

Thus, it follows that the current $i_{REXT}=i_{REP}$ and $i_{REF}=i_{TAIL}$, as will further be described below.

The output termination loop 50 adjusts an output voltage vterm_ctrl of error amplifier 52 until input voltages vsense rep at positive terminal 70 and vsense_rext at negative terminal 59 are equal. Accordingly, the current $i_{REXT}$ times the external reference resistor 62 equals the current $i_{REP}$ through termination resistor replica 54 times the combined resistances RREP of replica resistor 76 and NREP of replica transistor 78. Thus, the following relationship is provided:

vsense_rext=vsense_rep=(rext*$i_{REXT}$)=[R(NREP)+RREP] *$i_{REP}$

Replica transistor 78 operates in the triode region and therefore behaves like a voltage controlled resistor with the transistor's value being controlled by the transistor's gate voltage, and to some extent by the transistor's drain-source voltage.

Since termination resistor replica 54 is a copy of the output termination resistors 56 and 58, the resistance value of the output termination resistors is determined by the value of external resistor 62. Since the deviation from the ideal value of resistor 76 is continuously calibrated with reference to external resistor 62, the internal CMOS resistor 76 can be made of any material regardless of process-tolerance or temperature-dependency. Since external resistor 62, as well as, the internal composite resistors are connected to the same negative supply voltage, the effect of VSS supply noise is significantly reduced, since this noise is common for the comparison in the output termination loop 50.

With continuing reference to FIG. 2, common mode voltage control loop 51 will now be described. Common mode voltage control is provided by sensing the common mode voltage using a common mode error amplifier 90 and then comparing the common mode voltage to a voltage VCM generated by variable reference voltage 92. The common mode voltage is sensed through sensing resistors 96 and 98. If the common mode voltage sensed on line 91 is different from the voltage VCM generated by variable reference voltage 92, amplifier 90 outputs a common mode error signal VCM_CTRL on common mode control line 100. Common mode control line 100 is in communication with a voltage-to-current converter 102. Voltage-to-current converter 102 outputs a common mode current $i_{CM}$ on lines 104 and 106 in proportion to the error signal received on line 100. In this manner, current is sourced by voltage-to-current converter 102 into the output termination resistors 84, 84' of the line driver until the common mode voltage sensed on line 91 is substantially equal to the variable reference voltage 92. Once the common mode voltage control loop 51 has reached equilibrium the following equation is descriptive of the output voltage on terminals VOUT1 and VOUT2:

VOUT1=VOUT2=VSENSE=VCM=[RTERM1+R(NTERM1)] *(ICM+ITAIL/2)

Thus, the output common mode voltage can be made variable by applying a variable reference voltage VCM at the negative terminal 93 of the error amplifier 90. Due to the servo-loop (or control loop), VSENSE and therefore VOUT1 and VOUT2 continuously follow any change in voltage present at variable reference voltage 92.

The system and method used to achieve the output amplitude of the line driver device will here be described, with continuing reference to FIG. 2. A second programmable current mirror 110 is provided to source an output current "ITAIL" on line 118. Output amplitude can be linearly increased or decreased through linearly varying a variable reference current generator 112 that generates a reference current "IREF". By linearly increasing or decreasing reference current IREF, output current ITAIL may be varied. Thus, once the output amplitude is to be varied, ITAIL varies accordingly. This change causes the common mode loop to change current ICM until the loop has reached equilibrium.

An output stage 53 of IC 10 is provided to deliver the output amplitude and common mode voltage of IC 10.

Output stage 53 includes a pair of switches 120 and 122 in communication with a pair of sense resistors 96 and 98. Switches 120 and 122 are electrically connected with current mirror 110 and act as current switches. Thus, current flows either through switch 120 or through switch 122.

Figure 3:
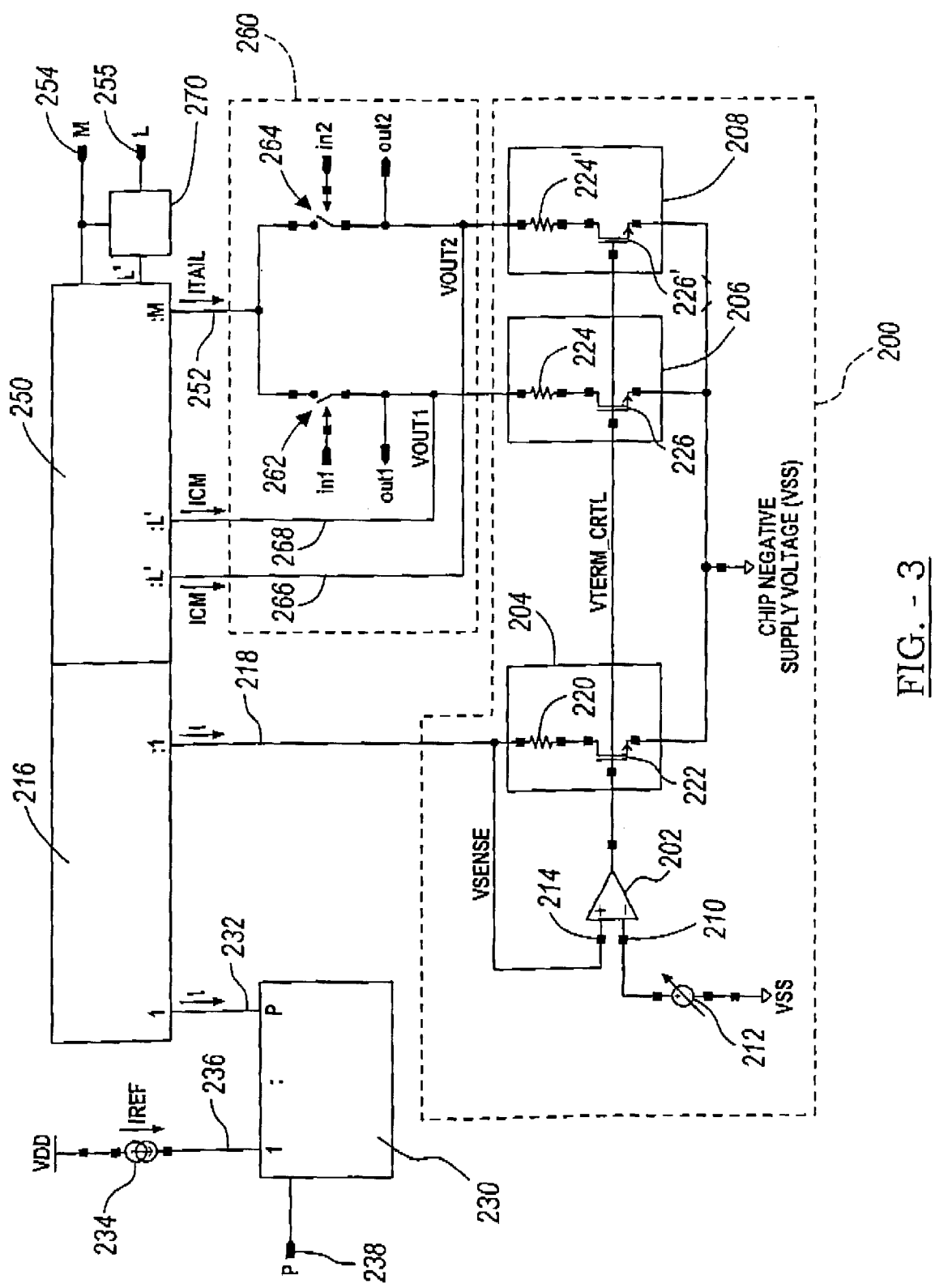
FIG. 3 is a schematic diagram of a second embodiment of an output line driver utilizing on-chip termination resistors, in accordance with the present invention.

Referring now to FIG. 3, another embodiment provides adjustable on-chip termination, adjustable common mode voltage control, and adjustable output voltage swing control. As with the previous embodiment, present embodiment may be incorporated into integrated circuits which normally require external output termination resistors. For example, present embodiment may be incorporated into a line driver.

The present embodiment includes one control loop. An output termination loop 200 controls the output termination resistance. The common mode voltage control loop present in the previous embodiment has been advantageously eliminated.

Output termination loop 200 includes an impedance termination error amplifier 202, a termination resistor replica 204, and two output termination resistors 206 and 208. The negative terminal 210 of error amplifier 202 is electrically connected to a reference voltage generator 212 that sources a reference voltage "VREF". A fixed current mirror 216 provides a source current "I" on line 218. The positive terminal 214 of error amplifier 202 is electrically connected to fixed current mirror 216 and to the high voltage side of termination resistor replica 204.

Termination resistor replica 204 includes a replica resistor 220 and a replica transistor 222 connected in series. Output termination resistors 206 and 208 generally include output resistors 224 and 224' and output transistors 226 and 226' also connected in series. Replica transistor 222 and output transistors 226 and 226' are CMOS transistors and resistors 220, 224, and 224' are preferably CMOS resistors. Other process technologies, such as PMOS, may be used for replica transistor 78 and output transistors 82 and 82'. The present embodiment further provides a programmable current mirror 230 in communication with fixed current mirror 216 for sourcing current "I" on line 232. Moreover, current mirror 230 electrically connects with a reference current generator 234 that sources a reference current "$I_{REF}$" on line 236. In operation, current "I" is developed by current mirror 230 by multiplying reference current "$I_{REF}$" by a factor P received on input line 238, such that the following relationship governs:

$$I = P \times I_{REF} \tag{1}$$

Once the output termination loop (or servo loop) 200 has settled, termination resistor replica 204 has an equivalent resistance which may be described by the following equation:

$$R_{RR} = V_{SENSE}/I = V_{REF}/I = V_{REF}/(P \times I_{REF}), \tag{2}$$

where:

$R_{RR}$=Termination resistor replica 204 equivalent resistance;

$V_{SENSE}$=Voltage sensed by error amplifier 202 on line 214;

I=current sourced by fixed current mirror 216;

$V_{REF}$=precise reference voltage from voltage generator 212;

P=current multiplier factor; and $I_{REF}$=reference current based on reference current generator 234.

Current consumption is limited in the servo loop by scaling down the size of termination resistor replica 204 as compared to output termination resistors 206 and 208. That is, output transistors 226 and 226' are the same type of transistors having similar size, physical characteristics and material composition as replica transistor 222. For example, if replica transistor 222 has a width=$W_{RT}$ and a length=$L_{RT}$ and output transistors 226 and 226' have widths=$W_{OT}$ and $W_{OT}$ and lengths=$L_{OT}$ and $L_{OT}$, then the following equation describes the relationship of the width-to-length ratio of the replica transistor 222 to the width-to-length ratio of output transistors 226 and 226':

$$W_{RT}/L_{RT} = 1/K \times W_{OT}/L_{OT} = 1/K \times W_{OT}/L_{OT} \tag{3}$$

Accordingly, replica resistor 220 is a scaled version of output resistors 224 and 224' such that the following equation governs:

$$R_3 = K \times R_1 = K \times R_2 \tag{4}$$

where:

$R_3$=resistance of the replica resistor 220;

$R_2$=resistance of the output resistor 224'; and $R_1$=resistance of the output resistor 224.

Thus, by increasing the equivalent resistance of resistor replica 204 by a constant factor "K," the bias current "I" is reduced by the same factor, resulting in a significant power reduction.

Moreover, since both $V_{REF}$ and $I_{REF}$ are derived from a precise electrical reference, the output termination resistance (OTR) of the line driver is independent of process parameters, temperature and supply variations. Thus, the OTR is:

$$R_{OTR} = 1/K \times R_{RR} = 1/K \times V_{REF}/(P \times I_{REF}) \tag{5}$$

and can be programmed to the desired value by varying the parameter P.

The system and method used to achieve the output amplitude of the line driver device of present embodiment will now be described, with continuing reference to FIG. 3. A second programmable current mirror 250 is provided to source an output current "$I_{TAIL}$" on line 252. Output current $I_{TAIL}$ is developed by current mirror 250 by multiplying a current "I" by a factor "M" received at program input terminal 254, such that, $$I_{TAIL} = I \times M. \tag{6}$$

An output stage 260 of the line driver is provided to deliver the output amplitude and common mode voltage of the line driver. Output stage 260 includes a pair of switches 262 and 264. Switches 262 and 264 are connected in parallel with the current mirror 250 and act as current switches. Thus, current flows either through switch 262 or through switch 264. Accordingly, the output voltage calculates to:

$$V_{OUT} = I_{TAIL} \times R_{OTR} = M \times I \times K \times V_{REF}/(P \times I_{REF}),$$

and after substituting equations (1) and (5) above, $$V_{OUT} = M \times P \times I_{REF} \times K \times V_{REF}/(P \times I_{REF});$$

which simplifies to:

$$V_{OUT} = M \times K \times V_{REF}$$

Since the factor K is fixed, the output amplitude solely depends on the parameter M and is responsive to the precise electrical reference $V_{REF}$. Therefore, the output voltage is insensitive to process variations and is maintained precisely over temperature and supply variations as programmed via M. It is important to note that the output voltage can be programmed independent of the selected output termination resistance.

With continuing reference to FIG. 3, common mode voltage control will now be described. Common mode voltage control is provided using programmable current mirror 250 that sources a common mode current "$I_{CM}$" on lines 266 and 268. That is, programmable current mirror 250 multiplies the current "I" by a factor "L" such that the common mode current "$I_{CM}$" may be described as follows:

$$I_{CM} = L' \times I$$

Where L' is derived from a parameter L, which is corrected using the parameter M, received at an input terminal 254 of current mirror 250. Beneficially, this configuration decouples the output common mode voltage setting from the output amplitude.

Thus, for example, the output common mode voltage would be:

$$V_{CM} = (i_{CM} + \tfrac{1}{2} \times I_{TAIL}) \times R_{OTR}$$

and with the appropriate substitutions:

$$V_{CM} = (L' \times I \times \tfrac{1}{2} M \times I) \times R_{OTR}$$

and with further substitution, the common mode voltage is independent of the parameter P:

$$V_{CM} = (L' \times P \times I_{REF} + \tfrac{1}{2} \times M \times P \times I_{REF}) \times 1/K \times V_{REF}/I_{REF} \times 1/P.$$

After simplification:

$$V_{CM} = (L' \times \tfrac{1}{2} \times M) \times 1/K \times V_{REF}.$$

To control the common mode voltage independently of the common mode amplitude, the following relationship is fulfilled:

$$L = L' - \tfrac{1}{2} \times M,$$

where:

L=the control parameter for the common mode level.

The control parameter L, received on input terminal 255, is corrected using the value of M, such that any change in the value of M, which otherwise would alter the common mode voltage $V_{CM}$, is reflected in the resulting mirror ratio L'. Mirror ratio L' is produced using digital logic in a logic correction block 270. Thus, the result is that the common mode voltage is independent of the programmed output amplitude:

$$V_{CM} = L \times 1/K \times V_{REF}.$$

Accordingly, the output common mode voltage depends on the independent fixed resistor ratio K and is responsive to the precise electrical reference VREF. Therefore, the common mode voltage is insensitive to process variations and is maintained precisely over temperature and supply voltage variations.

The present invention may have several advantages and benefits over the prior art. For example, in one embodiment, an integrated output termination resistor is provided using a combination of a controlled MOS transistor and a low precision CMOS resistor. The MOS transistor calibrates-out the imprecision of the CMOS resistor based on an electrical reference. The combination of a MOS transistor and CMOS resistor features higher linearity and precision than a MOS transistor alone due to the smaller effective drain-source voltage across the MOS transistor. In another embodiment, the MOS resistors are omitted from the replica output resistor as well as in the output termination resistors, and the output resistance is controlled with the MOS transistors operating in the triode region. Moreover, independent programmability of the integrated output termination resistor, the output common mode voltage, and the output amplitude is provided. The value of the output termination resistor(s), the value of the output common mode voltage, and the value of the output amplitude are controlled independently and are continuously maintained with respect to a precise electrical reference. As a result, the value of the output termination resistance, the value of the output common mode voltage, and the value of the output amplitude are insensitive to manufacturing process tolerances and variations in temperature and supply voltage.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A line driver device for providing an independently controllable output termination resistance, an output amplitude, and an output common mode, the device comprising:

a first programmable current mirror for multiplying a fixed reference current to achieve a first predetermined current;

a fixed current mirror for sourcing the first predetermined current;

an adjustable termination resistor connected to the fixed current mirror to receive the first predetermined current;

an error amplifier in communication with the adjustable termination resistor for sensing a termination resistor voltage across the adjustable termination resistor and comparing the termination resistor voltage to a fixed reference voltage, whereby the amplifier provides an amplifier output signal to the adjustable termination resistor to cause the termination resistor voltage to match the fixed reference voltage;

at least one adjustable output termination resistor in communication with the amplifier output signal;

a second programmable current mirror for multiplying the first predetermined current to achieve a second predetermined current for defining a common mode voltage and an output voltage amplitude; and an output stage in communication with the second programmable current mirror and the at least one adjustable output termination resistor, the output stage having a plurality of voltage controlled switches for defining an output polarity and an output voltage amplitude of the line driver.

2. The line driver of claim 1 wherein the first programmable current mirror is capable of producing an output current that is n times an input current, wherein n is variable.

3. The line driver of claim 1 wherein the fixed current mirror receives an input current and outputs an output current equal to the input current.

4. The line driver of claim 1 wherein the second programmable current mirror is capable of producing an output current that is n times an input current, wherein n is variable.

5. The line driver of claim 1 wherein the output stage has two voltage controlled switches.

6. The line driver of claim 1 further comprising two adjustable output termination resistors.

7. The line driver of claim 1 wherein the adjustable termination resistor further comprises a transistor.

8. The line driver of claim 7 wherein the transistor is a CMOS transistor.

9. The line driver of claim 1 wherein the adjustable termination resistor further comprises a resistor and a transistor connected in series.

10. The line driver of claim 9 wherein the transistor is a CMOS transistor and the resistor is a CMOS resistor.

11. A method for providing an independently controllable output termination resistance, output amplitude, and output common mode voltage in a line driver, the method comprising:

multiplying a fixed reference current to achieve a first predetermined current using a first programmable current mirror;

sourcing the first predetermined current using a fixed current mirror;

receiving the first predetermined current at an adjustable termination resistor connected to the fixed current mirror;

sensing a termination resistor voltage across the adjustable termination resistor using an error amplifier in communication with the adjustable termination resistor;

comparing the termination resistor voltage to a fixed reference voltage, whereby the amplifier provides an amplifier output signal to the adjustable termination resistor to cause the termination resistor voltage to match the fixed reference voltage;

multiplying the first predetermined current to achieve a second predetermined current for defining a common mode voltage and an output voltage amplitude using a second programmable current mirror; and providing an output polarity and an output voltage amplitude of the line driver using an output stage in communication with the second programmable current mirror and at least one adjustable output termination resistor in communication with the amplifier output signal, the output stage having a plurality of voltage controlled switches.

12. The method of claim 11 wherein multiplying a fixed reference current further comprises producing an output current that is n times a input current using the first programmable current mirror, wherein n is variable.

13. The method of claim 11 wherein sourcing the first predetermined current further comprises receiving an input current and outputting an output current equal to the input current using the fixed current mirror.

14. The method of claim 11 wherein multiplying the first predetermined current further comprises producing an output current that is n times an input current using the second programmable current mirror, wherein n is variable.

15. The method of claim 11 further comprising providing two voltage controlled switches in the output stage.

16. The method of claim 11 further comprising providing two adjustable output termination resistors.

17. The method of claim 11 further comprising providing a resistor and a transistor connected in series in the adjustable termination resistor.

18. The method of claim 17 wherein providing a resistor and a transistor further comprise providing a CMOS transistor and a CMOS resistor.

* * * * *